(12) United States Patent
Liu et al.

(10) Patent No.: US 6,304,822 B1
(45) Date of Patent: Oct. 16, 2001

(54) SPACECRAFT ATTITUDE CONTROL SYSTEMS WITH DYNAMIC METHODS AND STRUCTURES FOR PROCESSING STAR TRACKER SIGNALS

(75) Inventors: Yong Liu, San Marino; Yeong-Wei Andy Wu, Rancho Palos Verdes; Rongsheng Li, Hacienda Heights, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/629,961

(22) Filed: Aug. 1, 2000

(51) Int. Cl.⁷ .................................................. G01C 21/00
(52) U.S. Cl. ........................................ 701/222; 244/158 R
(58) Field of Search ................................ 701/222, 226; 244/158 R, 164; 356/141, 152

(56) References Cited

U.S. PATENT DOCUMENTS

5,225,885    7/1993   Beard et al. .................... 356/141
5,745,869    4/1998   Roelof et al. .................... 701/222

*Primary Examiner*—William A. Cuchlinski, Jr.
*Assistant Examiner*—Olga Hernandez
(74) *Attorney, Agent, or Firm*—T. Gudmestad (57) ABSTRACT

Methods are provided for dynamically processing successively-generated star tracker data frames and associated valid flags to generate processed star tracker signals that have reduced noise and a probability greater than a selected probability $P_{slctd}$ of being valid. These methods maintain accurate spacecraft attitude control in the presence of spurious inputs (e.g., impinging protons) that corrupt collected charges in spacecraft star trackers. The methods of the invention enhance the probability of generating valid star tracker signals because they respond to a current frame probability $P_{frm}$ by dynamically selecting the largest valid frame combination whose combination probability $P_{cmb}$ satisfies a selected probability $P_{slctd}$. Noise is thus reduced while the probability of finding a valid frame combination is enhanced. Spacecraft structures are also provided for practicing the methods of the invention.

28 Claims, 7 Drawing Sheets

| | NAVIGATIONAL ERROR | | 15 MINUTE F-F ERROR | | 25 MINUTE F-F ERROR | | 90 MINUTE F-F ERROR | |
|---|---|---|---|---|---|---|---|---|
| | NS | EW | NS | EW | NS | EW | NS | EW |
| STATIC PROCESSING | 25.60 | 27.70 | 34.03 | 37.09 | 35.56 | 39.25 | 38.32 | 40.75 |
| DYNAMIC PROCESSING | 6.85 | 9.38 | 8.66 | 12.25 | 9.38 | 13.73 | 9.86 | 14.70 |

SPACECRAFT ATTITUDE CONTROL SYSTEMS WITH DYNAMIC METHODS AND STRUCTURES FOR PROCESSING STAR TRACKER SIGNALS

GOVERNMENT RIGHTS

The invention described herein was made in the performance of work under NASA contract number NAS5-98069 and is subject to the provisions of Section 305 of the National Aeronautics and Space Act of 1958 (72 Stat. 435; 42 USC 2457).

BACKGROUND OF THE INVENTION

1. Field of the Invention

The present invention relates generally to spacecraft attitude control systems and, more particularly, to spacecraft attitude determination systems.

2. Description of the Related Art

Spacecraft attitude control is essential because a spacecraft must be properly oriented to perform the functions for which it was designed. Attitude control is generally realized with the aid of torque-generation elements (e.g., thrusters, momentum wheels and/or magnetic torquers) which apply torque inputs $U(t_n)$ to a spacecraft body so as to change its state $X(t_n)$ (e.g., its attitude and attitude rate).

To determine the current state, an attitude determination system typically receives attitude measurements $Y(t_n)$ from various instruments (e.g., star trackers) and, in response, generates attitude estimates $X^*(t_n)$ The difference between these attitude estimates $X^*(t_n)$ and a commanded attitude defines torque command signals and, in response to these torque command signals, the torque-generation elements apply corrective torque inputs $U(t_n)$ that urge the spacecraft body towards the commanded attitude.

As indicated by the symbol $t_n$, the measurements $Y(t_n)$ and estimates $X^*(t_n)$ are generally performed at successive times. Between each of these successive times, the attitude determination system typically receives attitude rate measurements $Y(t_n)$ from gyroscopes which enable it to extrapolate each attitude estimate to the time of the next attitude measurement. The difference between the extrapolated estimate and its corresponding measurement forms a residue which is processed with a variable gain factor to form a correction of the previous estimate and update it to a current estimate. These actions realize attitude estimates whose variances are significantly reduced from those of the measurements and they are generally performed with a recursive estimator process (e,g., a Kalman filter process) that is programmed into data processors of the attitude determination system.

Figure 1:
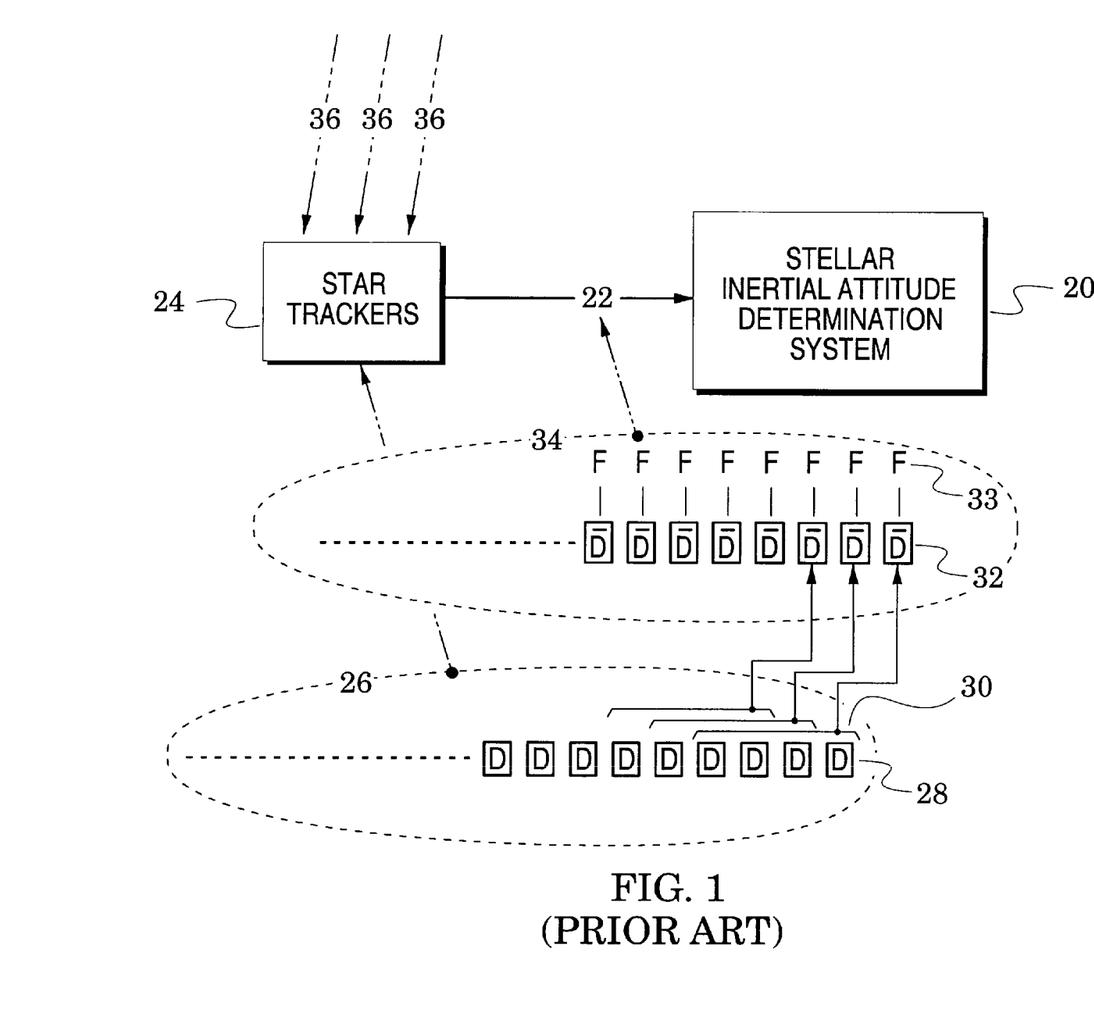
FIG. 1 is a block diagram which illustrates conventional static processing of data frames in conventional star trackers.

FIG. 1 shows an exemplary arrangement in which a stellar inertial attitude determination (SIAD) system 20 receives star tracker signals 22 from one or more star trackers 24. Star trackers are complex semiconductor systems which generally include a) an array of light sensitive elements that collect charge in response to incident light, b) an arrangement of charge-transfer elements that transfer (i.e., readout) the collected charges and c) an output structure that converts the transferred charges to corresponding voltage or current signals. The charge-transfer elements are generally realized with charge-coupled devices (CCDs) that are formed with metal-oxide semiconductor capacitors. Star trackers are thus sometimes referred to as CCD arrays and each array element is often referred to as an array pixel.

The collected charges of the array are processed into star centroids and each transfer of the processed charges to the star tracker output structure is typically referred to as a data frame. At a frame rate, therefore, the star tracker output signal provides frame data in the form of vertical coordinates $C_v$, horizontal coordinates $C_h$ and star magnitudes $M_s$ for respective stars in the star tracker's field of view. The SIAD system 20 uses the star magnitudes $M_s$ and the vertical and horizontal coordinates $C_v$ and $C_h$ to identify respective stars and the vertical and horizontal coordinates $C_v$ and $C_h$ to determine the spacecraft attitude with respect to known stellar positions.

Star tracker signals generally include noise which comprise temporal noise (e.g., circuit-generated noise and background thermal noise) and spatial noise (e.g., errors induced by a less than perfect charge transfer efficiency). In order to reduce this noise, star trackers typically average the frame data of multiple data frames to form their output signals.

As indicated within the broken-line ellipse 26 of FIG. 1, for example, the star tracker 22 internally generates successive data frames 28 (each indicated by a frame enclosing a letter D) at a frame rate. The star tracker 22 then averages (as indicated by bracket-and-arrow 30) the frame data of a plurality (e.g., four) of the most current data frames 28 to generate averaged data frames 32 (each indicated by a frame enclosing a letter D with an overhead line that symbolizes the averaging process) at the frame rate. In addition, the valid flags of the averaged data frames are anded to provide a corresponding valid flag 33 for each averaged data frame 32. The averaged data frames 32 and corresponding valid flags 33 thus form the star tracker signals 22 as indicated by the broken-line ellipse 34.

Because star trackers do not operate in a benign world, the charge collection at array pixels can be corrupted by spurious inputs such as the impinging protons 36 of FIG. 1. The major source of impinging protons are solar flares of the sun that ebb and flow in various rhythms (e.g., with an eleven year cycle). The operation of the SIAD system 20 is degraded if it processes signals from frame pixels (often referred to as "hot pixels") whose collected charges have been corrupted. Therefore, the star trackers 24 provide, for each averaged data frame 32, a flag that is set invalid if the collected charges differ excessively from their previous values and is set valid otherwise. In response, the SIAD system 20 only processes data frames that are accompanied by a valid flag.

The probability of obtaining valid data frames with the static processing of FIG. 1 decreases as the influx of impinging protons 26 increases. When this influx is high, the lack of valid data frames significantly degrades operation of the SIAD system 20 so that the accuracy of the spacecraft attitude control decreases. Under extreme influx conditions, spacecraft missions may be placed in jeopardy (especially long-term missions whose operational time frames include that of a solar flare).

SUMMARY OF THE INVENTION

The present invention is directed to methods for dynamically processing successively-generated star tracker data frames and associated valid flags to generate processed star tracker signals that have reduced noise and a probability greater than a selected probability $P_{slctd}$ of being valid. These methods maintain accurate spacecraft attitude control in the presence of spurious inputs (e.g., impinging protons) that corrupt collected charges in spacecraft star trackers.

In one method embodiment, valid data frames are identified, from the valid flags, in each of successive sets S of M data frames. The frame data in the valid data frames is then averaged to generate a processed star tracker signal at a rate 1/M of the rate of the data frames and with reduced noise. In this method embodiment, data frames are not statically selected for averaging but, rather, data frames of each set S are dynamically selected on the basis of their validity.

Another method embodiment comprises the process steps of a) selecting a plurality of different frame combinations $C_{frm}$ in each of successive sets S of M data frames wherein each frame combination $C_{frm}$ is formed with a respective number N of the M data frames;

b) calculating, in response to the valid flags and for each frame combination $C_{frm}$, a combination probability $P_{cmb}$ of being valid; and c) from all frame combinations $C_{frm}$ whose combination probabilities $P_{cmb}$ exceed a selected probability $P_{slctd}$, averaging the frame data of a valid one of those frame combinations that have the largest number N of the data frames to thereby obtain the processed star tracker signal at a rate 1/M of the rate of the data frames and with reduced noise.

The combination probabilities $P_{cmb}$ are calculated from a frame probability $P_{frm}$ which can be continuously tracked. The methods of the invention enhance the probability of generating valid star tracker signals because they respond to the current frame probability $P_{frm}$ by dynamically selecting the largest valid frame combination whose combination probability $P_{cmb}$ satisfies the selected probability $P_{slctd}$.

The latter method embodiment reduces the processing task because the frame probability $P_{frm}$ can be easily tracked over time, the calculation of the combination probabilities $P_{cmb}$ is straightforward and it is simple to determine the largest frame combinations whose combination probabilities $P_{cmb}$ exceed the selected probability $P_{slctd}$. The valid ones of the largest frame combinations can then be identified and, if there are more than one, the most current is preferably chosen.

Spacecraft structures are also provided for practicing the methods of the invention.

The novel features of the invention are set forth with particularity in the appended claims. The invention will be best understood from the following description when read in conjunction with the accompanying drawings.

DETAILED DESCRIPTION OF THE PREFERRED EMBODIMENTS

The present invention is directed to dynamic methods of processing star tracker data frames to significantly enhance the probability of providing valid star tracker signals to a spacecraft's SIAD system. These methods are particularly beneficial for long-term spacecraft missions which will be exposed to solar flares. The invention takes advantage of the fact that star trackers typically generate data frames at a frame rate that exceeds the recursive rate of estimator processes within the SIAD system.

Figure 2:
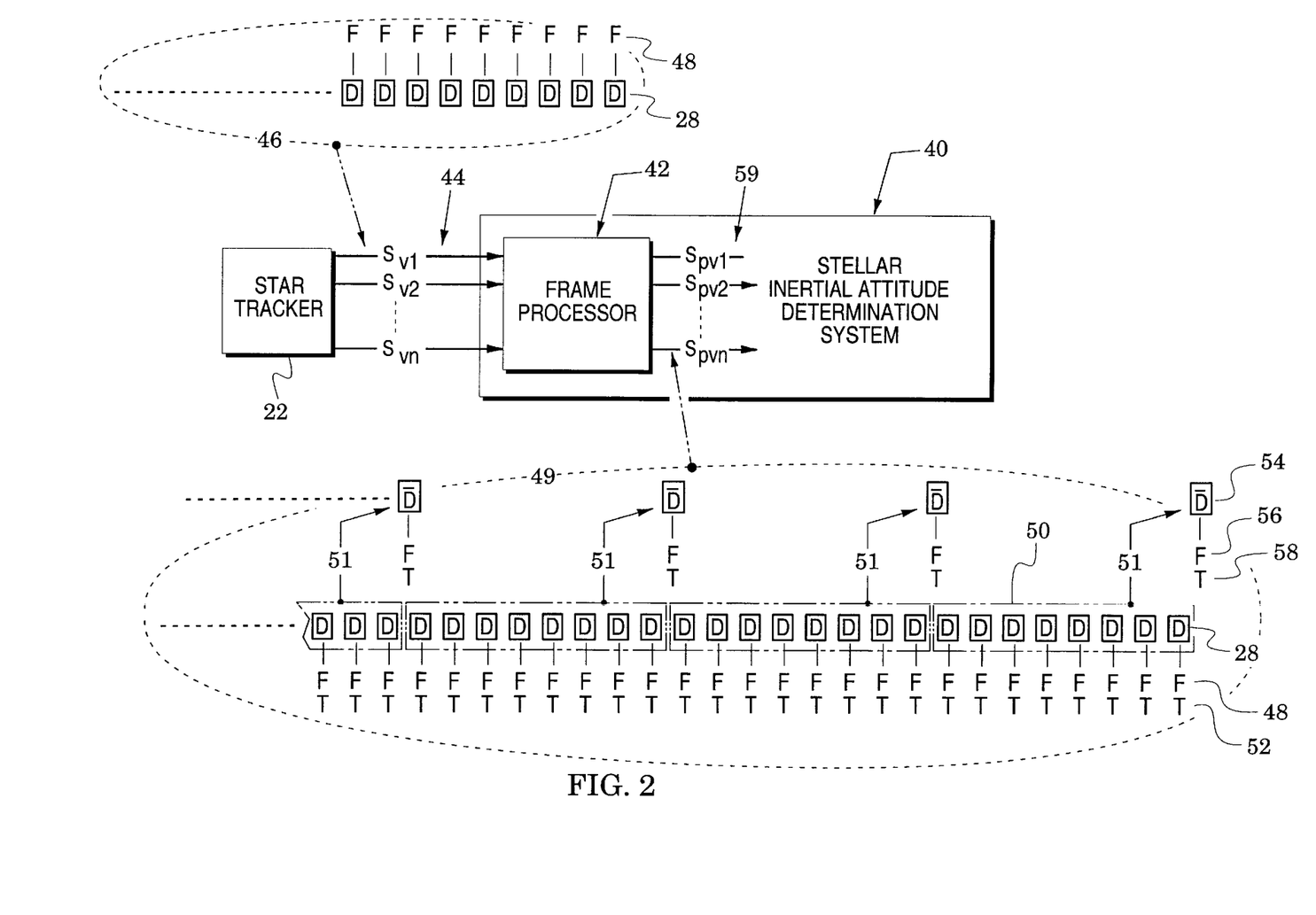
FIG. 2 is a block diagram which illustrates dynamic processing of star tracker data frames in an attitude determination system of the present invention.

FIG. 2 illustrates an embodiment of the invention in which a SIAD system 40 includes a frame processor 42 and the star trackers 22 (of FIG. 1) provide star tracker signals 44 to the frame processor 42. As indicated within the ellipse 46 of FIG. 2, the star tracker signals 44 are not formed of averaged data frames but, instead, simply comprise the data frames 28 (of FIG. 1) and corresponding valid flags 48.

The recursive rate of estimator processes within the SIAD system 40 is chosen to be 1/M that of the frame rate of the star trackers 22. The data frames 28 can therefore be considered, as indicated within the ellipse 49, in successive sets 50 of M data frames that each have a corresponding valid flag 48. In addition, each data frame 28 is assigned a corresponding time tag 52 that indicates that data frame's relative time location. For exemplary purposes, M has been assigned the value of eight in FIG. 2.

In a frame processing method of the invention, the valid data frames in each of the successive sets 50 are determined from their valid flags 48. All of the valid data frames within each set 50 are then averaged to provide, as indicated by arrows 51, an averaged data frame 54 that includes a mean vertical coordinate $C_{mv}$, a mean horizontal coordinate $C_{mh}$ and a mean star magnitude $M_{ms}$. A valid flag 56 is provided with each averaged data frame 54 and a time tag 58 is assigned to indicate the relative time position of the averaged data frames.

The averaged data frames 54, the valid flags 56 and the time tags 58 form the processed star tracker signals 59. The star tracker signals 44 are thus dynamically processed to form processed star tracker signals 59 at the output of the frame processor 42 at a rate 1/M of the rate of the data frames 28. By dynamically processing those data frames 28 that are valid in each set 50, noise content is reduced and the probability of providing valid star tracker signals to the SIAD system 40 is enhanced. In this method embodiment, data frames are no longer statically selected (e.g., selecting the most current four data frames) for averaging but, rather, data frames of each set 50 are dynamically selected on the basis of their validity.

With knowledge of the time tag 58, the SIAD system 40 is able to extrapolate the last attitude estimate $X^*(t_n)$ to a time that corresponds to the most current measurement $Y(t_n)$ as provided by the processed star tracker signals 59. This time matching is enhanced if the valid data frames that are averaged are restricted to consecutive data frames of the current set 50. In order to facilitate noise reduction, the largest group of consecutive data frames is averaged and, if there are more than one largest group, the most current group is preferably averaged.

Figure 3:
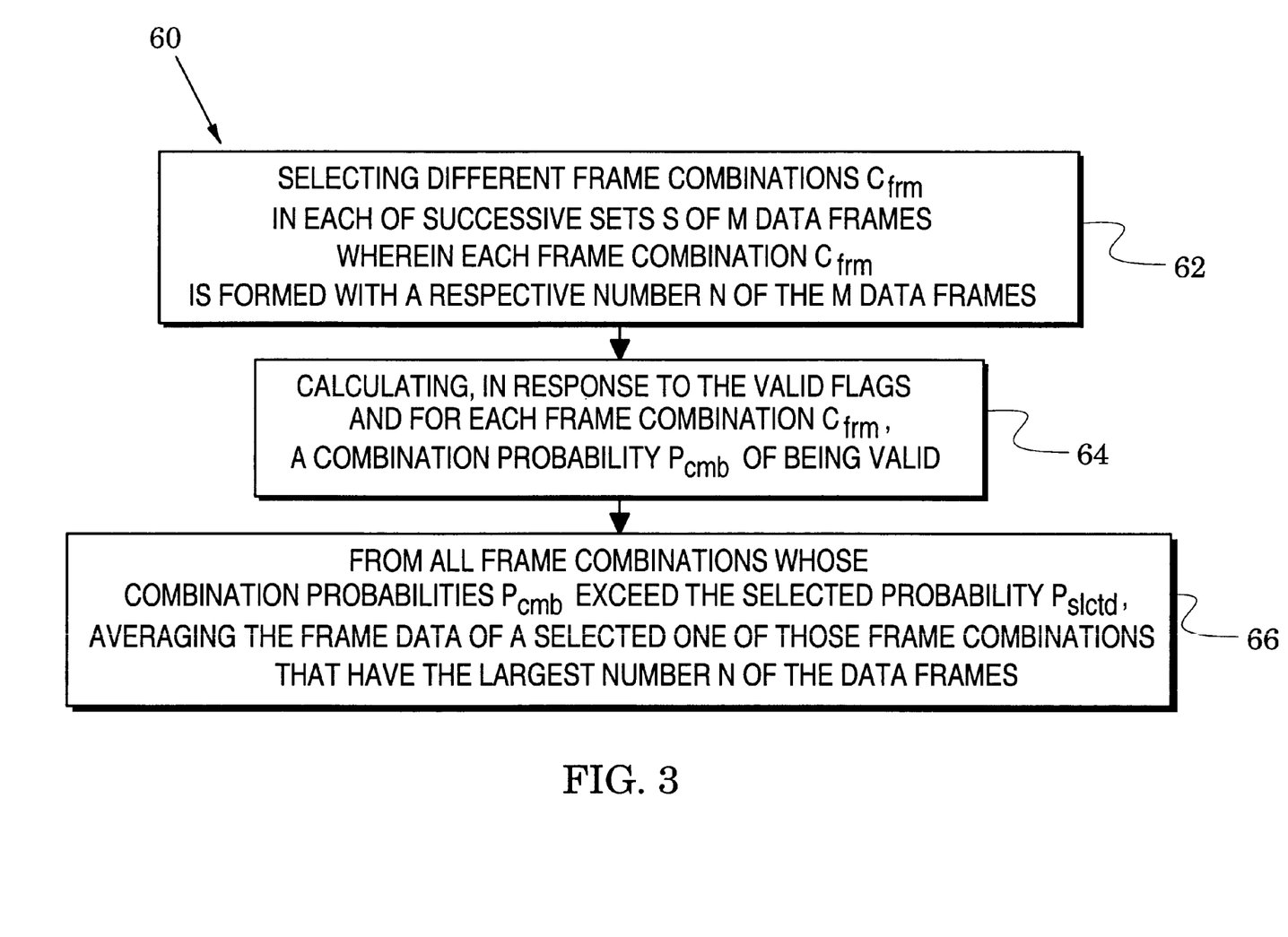
FIG. 3 is a flow chart which describes a method embodiment of the present invention for dynamic processing of star tracker data frames and associated valid flags.

Because spacecraft must be designed to meet demanding volume and weight specifications, processing capability is a limited spacecraft resource. Accordingly, the flow chart 60 of FIG. 3 illustrates another method embodiment of the invention which is particularly directed to reduction of the processing burden. The flow chart addresses dynamic processing of successively-generated star tracker data frames and associated valid flags to generate a processed star tracker signal that has reduced noise and a probability greater than a selected probability $P_{slctd}$ of being valid.

In a first process step 62 of this embodiment, different frame combinations $C_{frm}$ in each of the successive sets are selected wherein each frame combination $C_{frm}$ is formed with a respective number N of the M data frames. In response to the valid flags and for each frame combination $C_{frm}$, a combination probability $P_{cmb}$ of being valid is next calculated in process step 64. From all frame combinations $C_{frm}$ whose combination probabilities $P_{cmb}$ exceed the selected probability $P_{slctd}$, the frame data of a valid one of those frame combinations that have the largest number N of data frames is then averaged in process step 66 to thereby obtain the processed star tracker signal 59 of FIG. 2.

Figure 4:
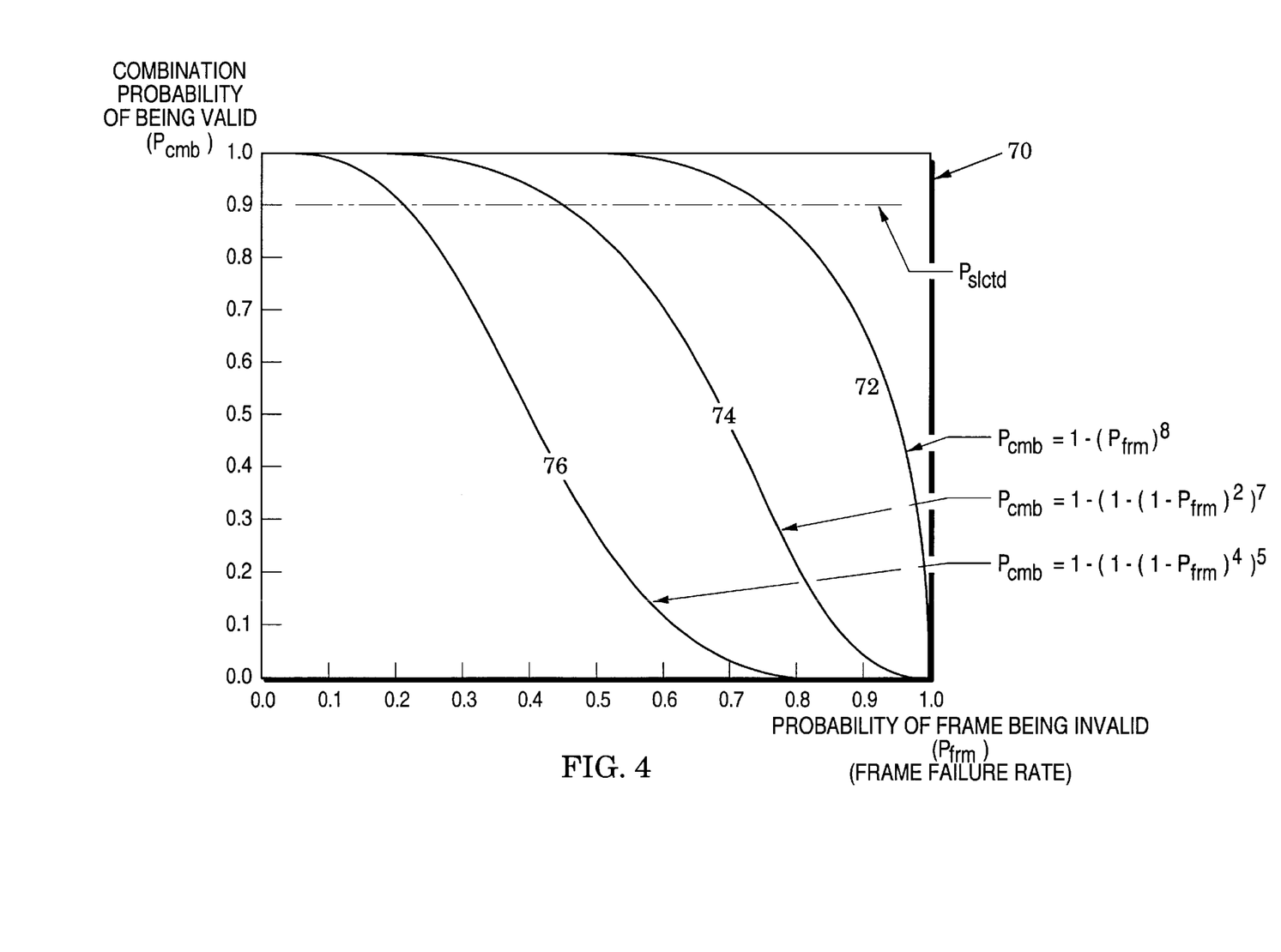
FIG. 4 is a graph that shows exemplary combination probabilities $P_{cmb}$ in the process steps of FIG. 3.

FIG. 4 is a graph 70 that provides a further understanding of the frame combinations $C_{frm}$ and combination probability $P_{cmb}$ of FIG. 3. Because of the methods by which they readout collected charges, some conventional star trackers induce averaging errors if an odd number of data frames are averaged. As mentioned above, it is generally preferable to average consecutive valid data frames so that a meaningful time tag can be supplied to the SIAD system (40 in FIG. 2). Accordingly, the graph 70 includes a plot 72 that corresponds to a single frame and plots 74 and 76 that correspond respectively to two and four consecutive data frames.

In order to compute the probabilities for these combinations, a frame probability $P_{frm}$ of any data frame being invalid is constantly monitored. The frame probability $P_{frm}$ is simply a ratio of the invalid frames to the total frames in any current group of frames. For example, the frame probability $P_{frm}$ can be determined for each successive set 50 of FIG. 2. For an exemplary set of eight data frames, it is apparent that the probability of at least one data frame being valid is then given by $$P_{cmb} = 1 - (P_{frm})^8 \qquad (1)$$

which is one less the probability that eight data frames are invalid. This probability is plotted as plot 72 in FIG. 4. Because there are seven ways that two consecutive data frames can be selected from the sets (50 in FIG. 3) of eight data frames, the probability of at least one combination of two consecutive data frames being valid is $$P_{cmb} = 1 - (1 - (P_{frm})^2)^7 \qquad (2)$$

and this probability is plotted as plot 74 in FIG. 4. Finally, there are five ways that four consecutive data frames can be selected from a set of eight data frames so that the probability of at least one combination of four consecutive data frames being valid is $$P_{cmb} = 1 - (1 - (P_{frm})^2)^7 \qquad (3)$$

and this latter probability is plotted as plot 76 in FIG. 4.

The selected probability $P_{slctd}$ is chosen high enough to insure that absent measurements occur at a low rate in the processed star tracker signals (59 in FIG. 2). FIG. 4 indicates an exemplary selected probability $P_{slctd}$ of 90%. When the frame probability $P_{frm}$ is less than approximately 22%, all of the combination probabilities of FIG. 4 exceed the selected probability $P_{slctd}$, so that (in accordance with process step 66 of FIG. 3) a combination of four consecutive data frames should be averaged to generate the averaged data frames 54 of FIG. 2. The latter combination is selected because it satisfies the selected probability and generates a star tracker signal with the lowest noise content.

When the frame probability $P_{frm}$ is less than approximately 46%, only plots 74 and 76 exceed 90%, so that a combination of two consecutive data frames should now be averaged to generate the averaged data frames 54 of FIG. 2 with the least noise content. Finally, one data frame is used for the star tracker signal when the frame probability $P_{frm}$ is less than approximately 22% since only the plot 72 then exceeds 90%.

Figure 5:
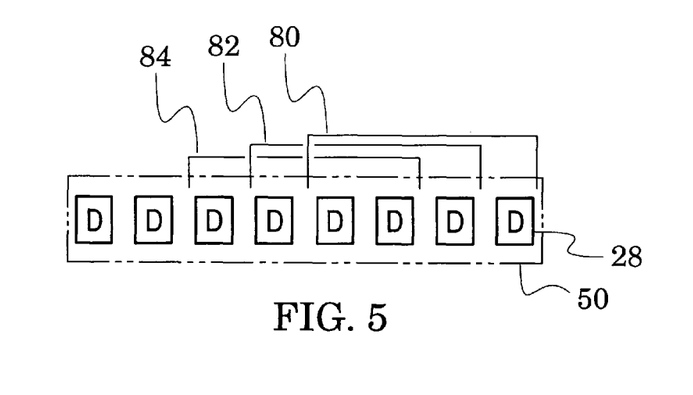
FIG. 5 is an enlarged view of an exemplary set of data frames of FIG. 2 which illustrates different frame combinations $C_{frm}$ in the process steps of FIG. 3.

As previously mentioned, the recursive estimator process of the SIAD system 40 of FIG. 2 is enhanced by providing it with the most current of available measurements. For example, there are five possible groups of four consecutive data frames in the sets 50 of FIG. 2. If the frame probability $P_{frm}$ is less than approximately 22%, and if more than one group of four consecutive data frames is valid, then the most current of these groups should be averaged to form the average data frame 54 of FIG. 2. The corresponding valid flag 56 would be set to its valid state and the corresponding time tag 58 would indicate a time appropriate for the selected group of four consecutive data frames. This example is illustrated in FIG. 5 which shows the most current set 50 of data frames 28 and three of the five possible groups of four consecutive data frames. These three are shown as the most current group 80, a less current group 82 and a least current group 84. If all of these groups are valid, the methods of the invention would select the most current group 80.

The method embodiment just described reduces the processing burden because the frame probability $P_{frm}$ can be tracked over time, the calculation of the combination probabilities $P_{cmb}$ is straightforward and it is simple to determine the largest frame combinations that exceed the selected probability $P_{slctd}$. All that remains is to find valid ones of the largest frame combinations and, if there are more than one, select the most current.

Conventional star trackers can track multiple stars by dividing their field-of-view into regions that each correspond to one of the tracked stars. Accordingly, the star tracker signal 44 of FIG. 2 can be considered to comprise virtual star tracker signals $S_{v1}$–$S_{vn}$ that each correspond to one of n tracked stars and thus include respective data frames and valid flags of that star. The frame processor 42 is then programmed to process each of the virtual star tracker signals to provide respective processed virtual star tracker signals $S_{pv1}$–$S_{pvn}$ in accordance with the previously described methods of the invention.

Figure 7:
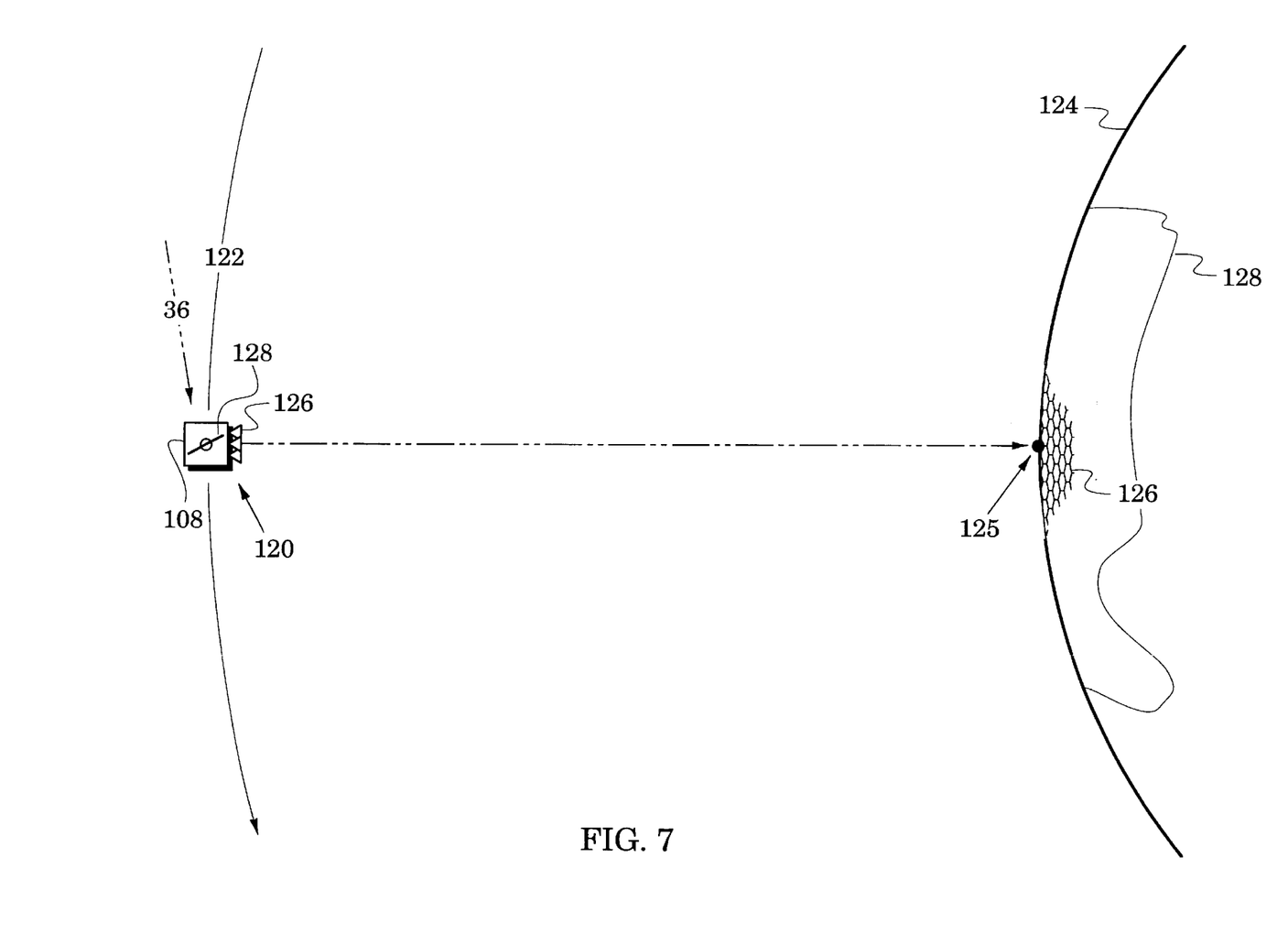
FIG. 7 is a view of an exemplary spacecraft that includes the attitude control system of FIG. 6.

FIG. 7 is a block diagram of an attitude control system 90 for practicing the methods of the invention. It includes a SIAD system 92 that includes the frame processor 42 of FIG. 2, a star catalog 94 and a spacecraft control processor 95 that is responsive to the frame processor 42 and the star catalog 94. The spacecraft control processor provides an attitude estimate $X^*(t_n)$ to a attitude processor 98 which generates a torque command signal 100 in response to the difference between the attitude estimate and a commanded attitude 101.

The torque command signal 100 is applied to a torque generation system 102 that uses torque generators such as thrusters 103, momentum wheels 104 and magnetic torquers 105 to generate torque inputs $U(t_n)$ which alter the state $X(t_n)$ of a spacecraft body 108. Star trackers 110 and gyroscopes 112 sense the altered state (indicated by the broken-line arrows 113) and, in response, provide state measurements Y($t_n$) to the frame processor 93 and the spacecraft control processor 95 respectively. All the other elements of FIG. 7 are typically carried by the spacecraft body 108 and an exemplary attitude and attitude rate measurement system comprises three star trackers and three gyroscopes arranged to sense about three orthogonal axes of the spacecraft body 108.

In operation of the attitude control system 90, the frame processor 42 is programmed to execute the methods of the invention. In particular, the frame processor responds to the star tracker signals from the star trackers 110 and generates the processed star tracker signals 59 that were described above relative to FIG. 2.

The spacecraft control processor 95 uses the star catalog 94 to identify stars in the processed star tracker signals 59. In addition, it is programmed to execute a recursive estimator process (e.g., a Kalman filter process) which responds to the processed star tracker signals 59 and the gyroscopes 112 and provides the attitude estimate X*($t_n$) to the attitude processor 98. In particular, the recursive estimator process uses the attitude rate estimates of the gyroscopes 112 to extrapolate the attitude estimates to a time that corresponds to that of the processed star tracker signals 59. This correspondence is facilitated by time tags (e.g., the time tags 58 of FIG. 2) that are generated by the methods of the invention. These time tags are preferably adjusted to account for transmission delays through data buses of the SIAD system 90.

Figure 8:
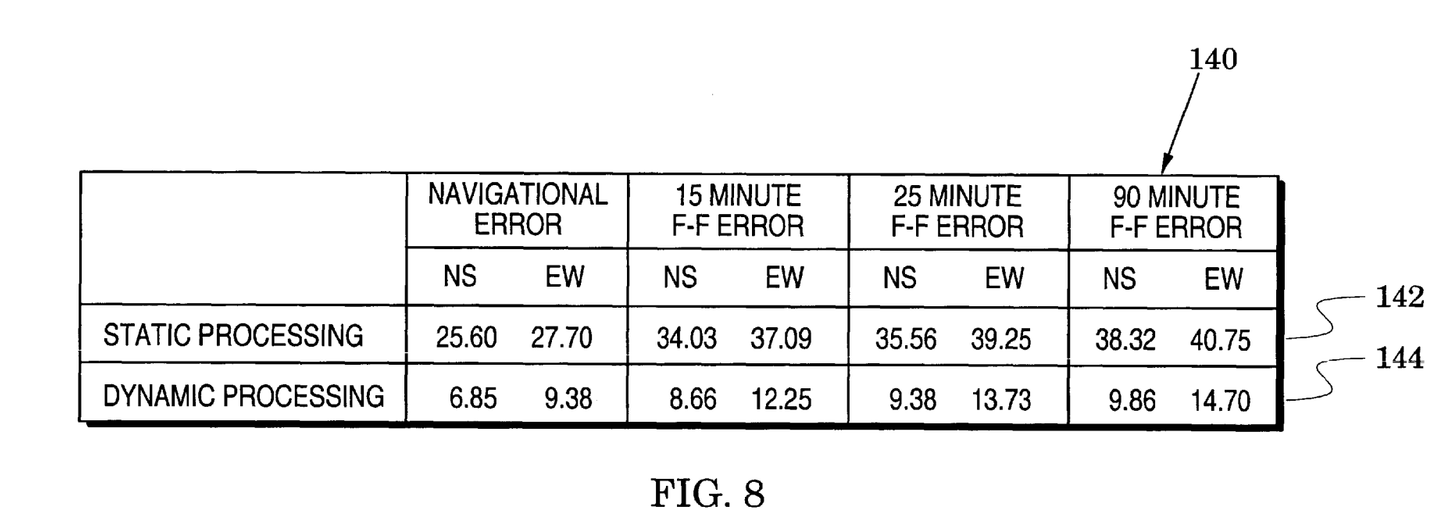
FIG. 8 is a table that illustrates simulation results of the present invention.

FIG. 8 illustrates an exemplary spacecraft 120 that travels in an orbital path 122 about the earth 124. The spacecraft has a body 108 that carries a communication system which incudes antennas 126 and a power generation system that includes solar panels 128. The attitude control system 90 of FIG. 7 is carried in the spacecraft's body 108 to control its attitude. For example, the sattelite's attitude may be controlled to direct its antennas 122 at various targets (e.g., a sub-orbital point 125 or respective communication cells 126 in a terrestrial area 128). The methods of the invention enhance the attitude control of the spacecraft 120 and particularly enhance that control when the spacecraft is in the presence of impinging protons 36.

The invention provides dynamic methods for processing successively-generated star tracker data frames and associated valid flags. Methods of the invention enhance the probability of generating valid star tracker signals because they respond to the current frame probability $P_{frm}$ by dynamically selecting the largest valid frame combination that satisfies the selected probability $P_{slctd}$.

These methods may be practiced with spacecraft and spacecraft control structures such as those shown in FIGS. 7 and 8. They may be practiced in an autonomous mode in which the averaging selections (e.g., as described with reference to FIG. 4) are performed by the processors of the SIAD system (e.g., system 92 of FIG. 6). Alternatively, they may be practiced via ground commands to the processors.

A dynamic method embodiment of the invention has been simulated and the results of that simulation are shown in the table 140 of FIG. 8 where they are compared to simulation results of the conventional static processing method shown in FIG. 1. The simulation addressed a dynamic processing mode in which the successive sets 50 of FIG. 2 each included eight data frames, the frame probability $P_{frm}$ was 50% and the frame combinations, frame combination probabilities and selected probability of FIG. 4 were used. The static and dynamic simulations were each conducted with a random solar flare model of impinging protons.

Figure 6:
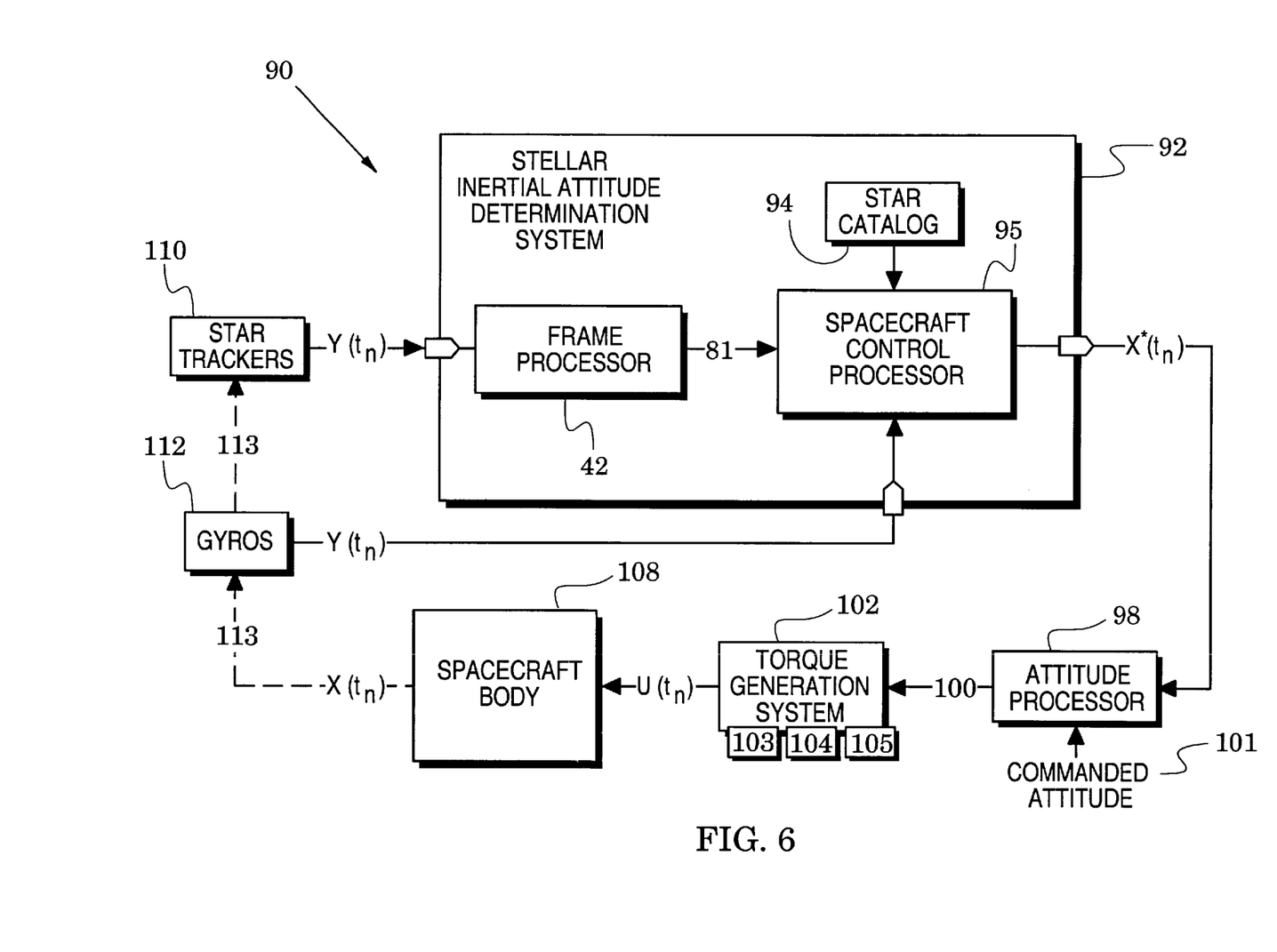
FIG. 6 is a block diagram of a spacecraft attitude control system for practicing dynamic processing methods of the present invention.

Attitude estimate variances (e.g., variances of X*($t_n$) in FIG. 6) were found for the static and dynamic simulations and respectively entered at lines 142 and 144 of the table 140. They were separated into vertical (NS) and horizontal (EW) ground-target pointing coordinates and found for a navigational mode, and 15, 25 and 90 minute frame-to-frame modes. As can be seen from the pointing errors (in microradians) in table 140, the dynamic methods of the invention significantly reduce the estimate variances.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of dynamically processing successively-generated star tracker data frames and associated valid flags to generate a processed star tracker signal that has reduced noise and a probability greater than a selected probability $P_{slctd}$ of being valid, wherein each of said data frames defines frame data that includes vertical coordinates $C_v$, horizontal coordinates $C_h$ and star magnitudes $M_s$ for respective stars, the method comprising the steps of:

determining, from said valid flags, the valid data frames in each of successive sets S of M data frames; and averaging, for each of said sets S, the frame data in said valid data frames to generate said processed star tracker signal at a rate 1/M of the rate of said data frames and with reduced noise.

2. The method of claim 1, wherein said averaging step includes the step of finding mean vertical coordinates $C_{mv}$, mean horizontal coordinates $C_{mh}$ and mean star magnitudes $M_{ms}$ from said valid data frames.

3. The method of claim 1, further including the step of restricting said averaging step to data frames of the largest group of consecutive valid data frames.

4. The method of claim 3, further including the step of restricting said averaging step to data frames of the most current of said largest group.

5. The method of claim 3, further including the step of providing a a time tag that specifies the time location of said largest group.

6. The method of claim 1, wherein M is 8.

7. The method of claim 6, wherein said selected probability $P_{slctd}$ is ninety per cent.

8. A method of dynamically processing successively-generated star tracker data frames and associated valid flags to generate a processed star tracker signal that has reduced noise and a probability greater than a selected probability $P_{slctd}$ of being valid, wherein each of said data frames defines frame data that includes vertical coordinates $C_v$, horizontal coordinates $C_h$ and star magnitudes $M_s$ for respective stars, the method comprising the steps of:

selecting a plurality of different frame combinations $C_{frm}$ in each of successive sets S of M data frames wherein each frame combination $C_{frm}$ is formed with a respective number N of said M data frames;

calculating, in response to said valid flags and for each frame combination $C_{frm}$, a combination probability $P_{cmb}$ of being valid; and from all frame combinations $C_{frm}$ whose combination probabilities $P_{cmb}$ exceed said selected probability $P_{slctd}$, averaging the frame data of a valid one of those frame combinations that have the largest number N of said data frames to thereby obtain said processed star tracker signal at a rate 1/M of the rate of said data frames and with reduced noise.

9. The method of claim 8, further including the step of dividing said star tracker data frames and associated valid flags into P virtual star tracker data frames and P associated virtual valid flags that correspond to respective stars and wherein said selecting, calculating and averaging steps are performed for each of said virtual tracker data frames and associated virtual valid flags.

10. The method of claim 9, wherein P is 5.

11. The method of claim 8, wherein said selecting step includes the step of restricting said frame combinations $C_{frm}$ to combinations of consecutive data frames.

12. The method of claim 8, wherein M is 8.

13. The method of claim 12, wherein N is restricted to 1, 2 and 4 and said selecting step includes the step of restricting said frame combinations $C_{frm}$ to combinations of consecutive data frames.

14. The method of claim 8, wherein said calculating step includes the steps of:

tracking, in response to said valid flags, a frame probability $P_{frm}$ of any data frame being invalid; and performing said calculating step in response to said frame probability $P_{frm}$.

15. The method of claim 8, wherein said averaging step includes the step of processing said frame data to find mean vertical coordinates $C_{mv}$, mean horizontal coordinates $C_{mh}$ and mean star magnitudes $M_{ms}$ for respective stars.

16. The method of claim 8, wherein said valid frame combination is the most current of those frame combinations that have the largest number N of said data frames.

17. The method of claim 16, further including the step of providing a time tag that specifies the time location of said selected frame combination.

18. An attitude-controlled spacecraft, comprising:

a spacecraft body;

at least one star tracker that is coupled to said body for providing successively-generated star tracker data frames and associated valid flags;

at least one gyroscope that is coupled to said body for providing attitude-rate signals;

a frame processor that dynamically processes said star tracker data frames and associated valid flags to generate a processed star tracker signal that has reduced noise and a probability greater than a selected probability $P_{slctd}$ of being valid, wherein each of said data frames defines frame data that includes vertical coordinates $C_v$, horizontal coordinates $C_h$ and star magnitudes $M_s$ for respective stars and said frame processor is programmed to perform the steps of:

a) selecting a plurality of different frame combinations $C_{frm}$ in each of successive sets S of M data frames wherein each frame combination $C_{frm}$ is formed with a respective number N of said M data frames;

b) calculating, in response to said valid flags and for each frame combination $C_{frm}$, a combination probability $P_{cmb}$ of being valid; and c) from all frame combinations $C_{frm}$ whose combination probabilities $P_{cmb}$ exceed said selected probability $P_{slctd}$, averaging the frame data of a valid one of those frame combinations that have the largest number N of said data frames to thereby obtain said processed star tracker signal at a rate 1/M of the rate of said data frames and with reduced noise;

a data processor in said body that is programmed to perform a recursive estimator process that generates an attitude estimate in response to said processed star tracker signal and said attitude-rate signals;

an attitude processor in said spacecraft that generates torque generation signals in response to an attitude difference between a commanded attitude and said attitude estimate; and a torque generation system that is coupled to generate torques in said body in response to said torque generation signals to thereby reduce said attitude difference;

said frame processor generating said star-tracker signal with a probability greater than said selected probability $P_{slctd}$ of being valid to thereby enhance the attitude control of said spacecraft.

19. The spacecraft of claim 18, wherein said selecting step includes the step of restricting said frame combinations $C_{frm}$ to combinations of consecutive data frames.

20. The spacecraft of claim 18, wherein said calculating step includes the steps of:

tracking, in response to said valid flags, a frame probability $P_{frm}$ of any data frame being invalid; and performing said calculating step in response to said frame probability $P_{frm}$.

21. The spacecraft of claim 18, wherein said valid frame combination is the most current of those frame combinations that have the largest number N of said data frames.

22. The spacecraft of claim 18, further including the step of providing a time tag that specifies the time location of said selected frame combination.

23. The spacecraft of claim 18, wherein said selected probability $P_{slctd}$ is ninety per cent.

24. The spacecraft of claim 18, wherein said at least one star tracker comprises three star trackers directed along three mutually-orthogonal axes of said spacecraft and said at least one gyroscope comprises three gyroscopes arranged to detect spacecraft rotation about said axes.

25. The spacecraft of claim 18, further including solar wings coupled to said body to generate power.

26. The spacecraft of claim 18, further including antennas coupled to said body to transmit and receive communication signals.

27. The spacecraft of claim 18, wherein said torque generation system includes thrusters coupled to said body.

28. The spacecraft of claim 18, further including the step of dividing said star tracker data frames and associated valid flags into P virtual star tracker data frames and P associated virtual valid flags that correspond to respective stars and wherein said selecting, calculating and averaging steps are performed for each of said virtual tracker data frames and associated virtual valid flags.

* * * * *